US008628109B2

(12) United States Patent
Daley et al.

(10) Patent No.: US 8,628,109 B2
(45) Date of Patent: Jan. 14, 2014

(54) USER INTERFACE FOR A POWER FOLDING STROLLER

(75) Inventors: Robert D. Daley, Pittsburgh, PA (US); Henry F. Thorne, West View, PA (US); Elijah M. Wiegmann, Pittsburgh, PA (US); John J. Walker, Pittsburgh, PA (US); Frederick Karl Hopke, Glenshaw, PA (US)

(73) Assignee: Thorley Industries LLC, Pittsburgh, PA (US)

( * ) Notice: Subject to any disclaimer, the term of this patent is extended or adjusted under 35 U.S.C. 154(b) by 111 days.

(21) Appl. No.: 13/268,052

(22) Filed: Oct. 7, 2011

(65) Prior Publication Data

US 2012/0086187 A1 Apr. 12, 2012

Related U.S. Application Data

(60) Provisional application No. 61/390,766, filed on Oct. 7, 2010.

(51) Int. Cl.
*B62B 7/12* (2006.01)

(52) U.S. Cl.
USPC .......... 280/647; 280/650; 280/658; 280/47.38

(58) Field of Classification Search
USPC ............... 280/647, 642, 650, 657, 658, 47.38
See application file for complete search history.

(56) References Cited

U.S. PATENT DOCUMENTS

| 4,809,804 A * | 3/1989 | Houston et al. ............. 180/65.51 |
| 5,180,023 A * | 1/1993 | Reimers ....................... 180/19.1 |
| 5,366,036 A * | 11/1994 | Perry ........................... 180/65.1 |
| 5,526,894 A * | 6/1996 | Wang ........................... 180/65.1 |
| 5,622,376 A * | 4/1997 | Shamie ........................ 280/642 |
| 6,394,633 B1 * | 5/2002 | Perez ........................... 362/459 |
| 6,877,760 B2 * | 4/2005 | Wang ........................... 280/642 |
| 6,908,154 B2 * | 6/2005 | Aono ............................ 297/330 |
| 7,229,091 B2 * | 6/2007 | Lan .............................. 280/642 |
| 7,422,230 B2 * | 9/2008 | Chuan .......................... 280/642 |
| 7,523,954 B2 * | 4/2009 | Dotsey et al. ................ 280/642 |
| 7,717,457 B2 * | 5/2010 | Bearup et al. ................ 280/647 |
| 8,256,793 B1 * | 9/2012 | Krieger ........................ 280/650 |
| 2001/0007390 A1 * | 7/2001 | Klaiber ........................ 280/647 |
| 2005/0098981 A1 * | 5/2005 | Chang .......................... 280/642 |
| 2007/0262565 A1 * | 11/2007 | Bearup et al. ................ 280/642 |
| 2008/0211206 A1 * | 9/2008 | Thorne et al. ................ 280/650 |
| 2008/0238042 A1 * | 10/2008 | Chen et al. ................... 280/650 |
| 2010/0045001 A1 * | 2/2010 | Thorne et al. ................ 280/642 |
| 2011/0248478 A1 * | 10/2011 | Thorne et al. ................ 280/650 |
| 2012/0086187 A1 * | 4/2012 | Daley et al. .................. 280/642 |

FOREIGN PATENT DOCUMENTS

| DE | 10026375 A1 | 11/2001 |
| GB | 2438685 A | 12/2007 |
| JP | 9240480 A | 9/1997 |
| WO | 2007134282 A2 | 11/2007 |

* cited by examiner

*Primary Examiner* — Jeffrey J Restifo
*Assistant Examiner* — Erez Gurari
(74) *Attorney, Agent, or Firm* — The Webb Law Firm

(57) ABSTRACT

A user interface for a power folding stroller includes: a rotational mechanical joint positioned on the handlebars of the stroller. The rotational mechanical joint is coupled to electrical sensors that must be activated by the user rotating a ring combined with a second step of pressing a button to activate the folding or unfolding process. Once the ring has been rotated the required distance and returned to a home position, an indication, such as an LED light, may be provided to the user that the second action of pushing the button can be undertaken.

11 Claims, 9 Drawing Sheets

USER INTERFACE FOR A POWER FOLDING STROLLER

CROSS-REFERENCE TO RELATED APPLICATIONS

This application claims priority to U.S. Provisional Patent Application Ser. No. 61/390,766, filed Oct. 7, 2010 entitled "User Interface for a Power Folding Stroller", which is incorporated herein in its entirety.

BACKGROUND OF THE INVENTION

1. Field of the Invention

The present invention relates generally to strollers, and more particularly, pertains to a user interface that allows a user to control a baby stroller having one or more components which can be moved by a drive mechanism.

2. Description of Related Art

Baby strollers, also referred to as baby carriages, baby buggies, or prams, have been used to hold and transport babies and young children for many years. Early baby strollers had parts which were fixedly secured to one another such that they did not fold for compactness. More recently, baby strollers have been designed to have some parts which are movable relative to one another to allow movement of some parts of the stroller to achieve a more compact configuration when not in use. However, current strollers do not allow for movement or folding to compact configuration as desired, and are cumbersome and sometimes difficult to move between their collapsed (closed) positions and their operative (open) positions, particularly when attending to a baby or child.

A stroller which is easier to move between its collapsed and operative positions, such as one that does so upon the operation of a user interface via motorized movement, is desired. However, the challenges for designing a user interface for a stroller that opens or closes under electrical power are to make the process intuitive, easy, and fast for a user to operate, desirably with a single hand. However, the interface must also be designed so that it is difficult to be operated unintentionally, for example, when the stroller is in the trunk of the car.

Accordingly, a need exists for a user interface for a power folding stroller that is intuitive, easy, and fast for a user to operate while also being difficult to operate unintentionally.

SUMMARY OF THE INVENTION

An object of the present invention is to provide a user interface for a power folding stroller that is intuitive, easy, and fast for a user to operate while also being difficult to operate unintentionally.

In order to prevent unintentional folding on the part of the user, the interface must include two or more distinct actions on the part of the user in order to allow the stroller to fold. The interface for opening (unfolding) the stroller may be the same as the interface for closing the stroller. The actions required by the interface may be simultaneous or sequential and may include any combination of mechanical or electrical interactions including mechanical couplings to electrical interfaces, but must include at least one electrical interface.

The invention also incorporates timing or sequencing elements into the interface. Therefore, the timing or the sequence of the two or more actions must be designed so that it is never possible for the user to accidentally fold the stroller using only a single action. This enables the interface to be easy for a user to operate but robust to unintentional interaction. The timing or sequencing elements may be mechanical or electrical in nature. For example, a spring-loaded mechanical element may need to be slid to the right and then depressed, which would activate an electrical switch to close the stroller. It is preferred that the interface be robust to failure so that when the interface is broken, it is not possible for a single action to activate the stroller. Therefore, the alternative mechanical interface of a spring loaded protective cover that must be raised in order to allow the user to depress an electrical button would be less desirable since a user could accidentally or intentionally remove the protective cover, requiring only a single action in the future.

The present invention is directed to a user interface for a power folding stroller that includes: a rotational mechanical joint coupled to electrical sensors that must be activated by the user rotating a ring combined with a second step of pressing a button to activate the folding or unfolding process. The amount of rotation of the ring may be between about 45 and 120 degrees since this amount can be done easily with the thumb. However, the amount of rotation could be as little as 10 degrees on a sufficiently large ring, or could involve multiple rotations of the ring. Desirably, the ring is spring loaded to return to a home position. A stop may be provided to indicate to the user when the ring has been rotated to the end position. Once the ring has been rotated the required distance and returned to the home position, an indication, such as an LED light, may be provided to the user that the second action (e.g., pushing a button) can be undertaken. More specifically, it is important that the interface communicate to the user the state of the system, particularly in the event of a sequential interface. For instance, correctly activating the ring causes the ring to glow with LEDs indicating that the button may now be pressed to fold or unfold the stroller. After a set amount of time, for example 30 seconds, if the button is not pressed, the lights blink and then go out indicating that the interface has been reset.

Two sensors may be positioned around the ring at approximately 15 degrees of activation and approximately 60 degrees of activation. A magnet in the ring triggers each sensor as the ring is rotated by the user. If the button is pressed while the ring is being rotated, the ring must be returned to the home position, then rotated to the correct position without any interference, and finally the button must be pushed. Similarly, if the ring is held in the end position and not returned to the home position before the button is pressed, the interface does not grant access to fold the stroller. Finally, if both ring sensors are activated simultaneously (due to a strong external magnetic field), the stroller will not fold.

The user interface of the present invention also includes various timing aspects. For example, the preferred embodiment of the interface requires that the total amount of time from when the user begins to turn the ring until the ring is fully engaged and returned to the home position should not exceed a predefined limit, such as 10 seconds. These criteria can be adjusted as desired to ensure the interface is robust to unintentional activation.

Alternatively, the interface could be completely electrical, such as entering a sequence of characters on a touch screen interface, requiring the user to touch virtual buttons on a touch screen interface, or even requiring the user to write the answer to a simple question on a touch screen interface in order to fold. In any of these interfaces, if the process is not completed correctly, the stroller would not function. A more sophisticated electronic interface with questions to answer has the additional benefit that a child cannot activate the stroller but an adult can easily operate the stroller.

In addition, the interface may include timing, such as requiring the user to hold a first button for some time, for example, 3 seconds, and then press a second button. If the second button were depressed during the activation of the first button, or if the second button were not pressed within some short amount of time (for example 10 seconds) of holding the first button, or if the first button were held for too long (10 seconds instead of 3) the interface would reset. The user interface in this instance should provide the user with some type of indication or feedback that the user is to proceed to the second of the two steps.

Finally, the user interface of the present invention may include the ability to be locked. For instance, a mechanical switch may be engaged to prevent the ring from rotating. In an alternative embodiment, the switch may be electrical causing the system to ignore any inputs.

Many other potential embodiments of a user interface for activating a power folding stroller have been envisioned. For example, the interface may require the user to alternate between pushing a left and a right button 3 times each in quick succession. If either button were pressed too many times or too few times, the system would not function properly.

Specifically, provided is a user interface for a power folding stroller that includes: a first activation means for enabling at least one other activation means; and at least one of the at least one other activation means for sending a signal to a controller to activate a drive mechanism to fold the power folding stroller if the power folding stroller is in an unfolded state or unfold the power folding stroller if the power folding stroller is in a folded state.

The first activation means and the at least one other activation means may be operated either simultaneously or sequentially. The user interface may be mounted on a handlebar assembly of the power folding stroller. An indicator may be provided once the first activation means has sent a signal to the controller. The first activation means may be a rotating ring configured to activate at least one first sensor and at least one of the at least one other activation means may be a push button configured to activate at least one second sensor. The first activation means enables at least one of the at least one other activation means for a predetermined period of time.

Also provided is a user interface for a power folding stroller that includes: a rotational mechanical joint comprising a rotating ring member connected to the power folding stroller; at least one sensor positioned beneath the rotating ring member; a button positioned within the rotating ring; and a controller electrically coupled to the at least one sensor and the button. The rotating ring is rotated from a first position to a second position to cause the at least one sensor to enable the button, and the button is pressed to send a signal to the controller to activate a drive mechanism to fold the power folding stroller if the power folding stroller is in an unfolded state or unfold the power folding stroller if the power folding stroller is in a folded state.

The rotating ring may be spring loaded to return to the first position. A stop may be provided under the rotating ring to prevent the rotating ring from rotating beyond the second position. The at least one electrical sensor may be a sensor for detecting a magnetic field. At least one magnet may be positioned within the rotating ring that is detected by the at least one electrical sensor as the at least one magnet is rotated over the at least one electrical sensor during rotation of the rotating ring. An indicator, such as an LED light, may be provided once the rotating ring has reached the second position. A mechanical switch may be engaged to prevent the rotating ring from rotating.

In addition, provided is a method for activating a power folding stroller. The method includes: activating a first activation device of the user interface to enable at least one other activation means; and activating at least one of the at least one other activation means for sending a signal to a controller of the power folding stroller to fold the power folding stroller if the power folding stroller is in an unfolded state or unfold the power folding stroller if the power folding stroller is in a folded state.

The user interface of the present invention provides significant benefits for a stroller that uses power to open or close. More specifically, it helps ensure safe operation by reducing the chance of the caregiver unintentionally folding the stroller. This user interface is in addition to other safety mechanisms such as a sensor to detect the presence of a child in the seat, which may also incapacitate the stroller's ability to power fold, or sensors to detect the amount of current drawn by the stroller, which can also indicate obstructions resulting from an unsafe operation of the stroller.

These and other features and characteristics of the present invention, as well as the methods of operation and functions of the related elements of structures and the combination of parts and economies of manufacture, will become more apparent upon consideration of the following description with reference to the accompanying drawings, wherein like reference numerals designate corresponding parts in the various figures. It is to be expressly understood, however, that the drawings are for the purpose of illustration and description only and are not intended as a definition of the limits of the invention. As used in the specification and the claims, the singular form of "a", "an", and "the" include plural referents unless the context clearly dictates otherwise.

DETAILED DESCRIPTION OF THE INVENTION

Figure 1:
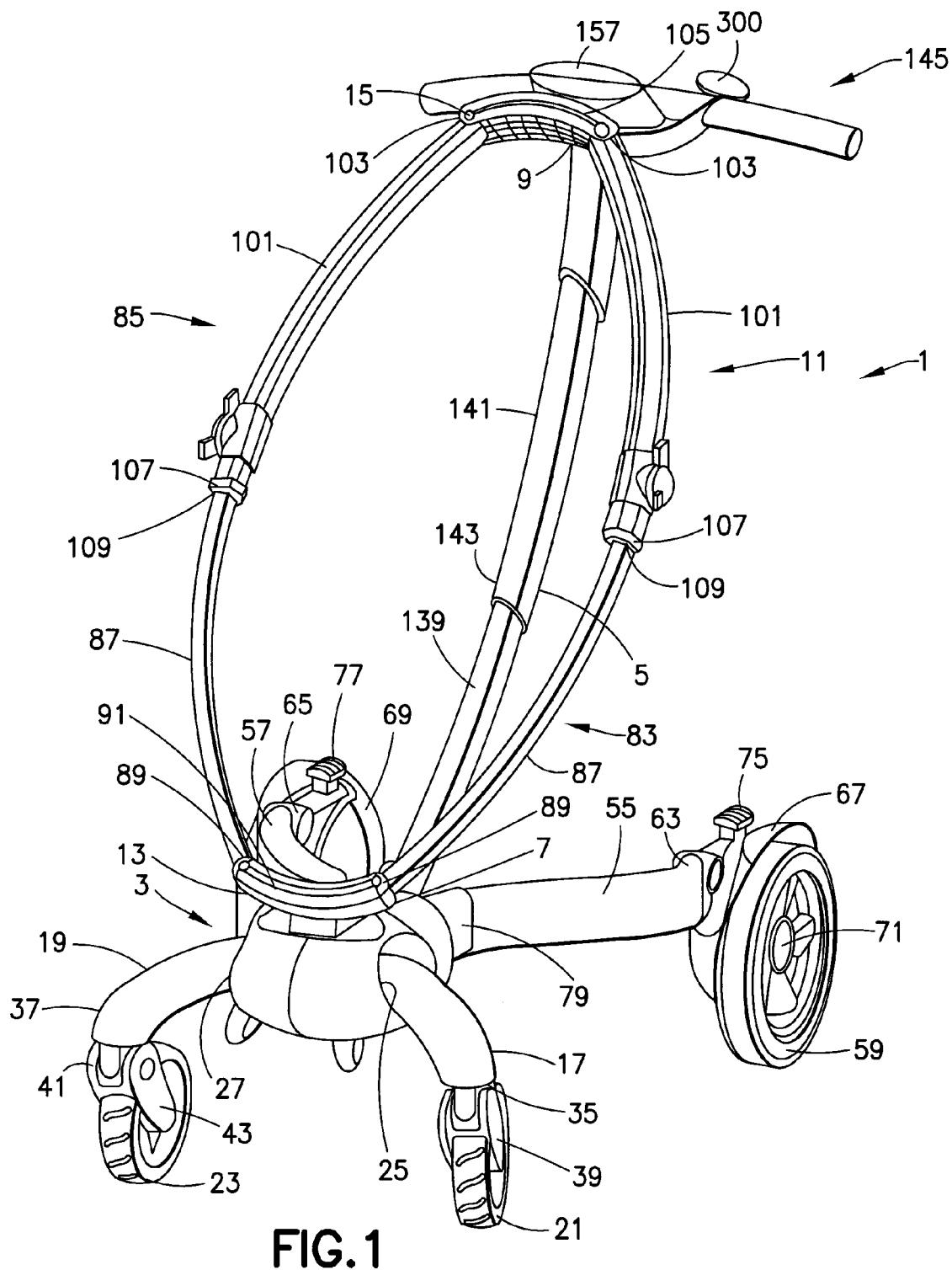
FIG. 1 is a perspective view of a collapsible stroller shown in its open position in accordance with the present invention.

For purposes of the description hereinafter, the terms "upper", "lower", "right", "left", "vertical", "horizontal", "top", "bottom", "lateral", "longitudinal", and derivatives thereof, shall relate to the invention as it is oriented in the drawing figures. However, it is to be understood that the invention may assume alternative variations and step sequences, except where expressly specified to the contrary. It is also to be understood that the specific devices and processes illustrated in the attached drawings, and described in the following specification, are simply exemplary embodiments of the invention. Hence, specific dimensions and other physical characteristics related to the embodiments disclosed herein are not to be considered as limiting.

With reference to FIGS. 1-5 and 8, a stroller, denoted generally as reference numeral 1, includes a hub 3; a support structure 5 having a first end 7 coupled to hub 3 and a second end 9; a seating portion 11 having a bottom portion 13 coupled to a top portion of hub 3 and a top portion 15 coupled to second end 9 of support structure 5. Stroller 1 is configured to collapse in the length, width, and height directions for storage and transportation as shown in FIG. 9 and expand in the length, width, and height directions for use as shown in FIGS. 1-5.

Stroller 1 further includes a first front leg 17 rotationally coupled to hub 3 and a second front leg 19 rotationally coupled to hub 3. A first front wheel 21 is rotationally coupled to and supported by first front leg 17 and a second front wheel 23 is rotationally coupled to and supported by second front leg 19. A proximal end 25, 27 of each front leg 17, 19 is rotatably engaged with hub 3, thereby enabling rotational movement of each front leg 17, 19 about hub 3 between an open position (see FIGS. 1-5) and a collapsed position (see FIG. 9). Pivotally connected to a distal end 35, 37 of each front leg 17, 19 is a pair of generally U-shaped wheel receiving members 39, 41 for receiving respective front wheels 21, 23. Each wheel receiving member 39, 41 comprises an axle 43 to allow the front wheels 21, 23 to roll about their respective axles 43.

Stroller 1 further includes a first rear leg 55 and a second rear leg 57. First rear leg 55 and second rear leg 57 are rotationally coupled to hub 3. In addition, first rear leg 55 and second rear leg 57 are mechanically coupled to each other and to first front leg 17 and second front leg 19. Each rear leg 55, 57 has a long cross-sectional dimension and a short cross-sectional dimension. In addition, each rear leg 55, 57 is configured to rotationally support a rear wheel 59, 61 at a distal end 63, 65 thereof within a respective rear wheel housing 67, 69. More specifically, the respective axles 71 of rear wheels 59, 61 are received in the respective rear wheel housings 67, 69 to allow the rear wheels 59, 61 to roll about their respective axles 71. Each rear wheel housing 67, 69 houses a braking mechanism, operated by either or both of brake pedals 75, 77, for selectively locking rear wheels 59, 61 to prevent inadvertent rolling movement of stroller 1 when the braking mechanism is locked.

Figure 9:
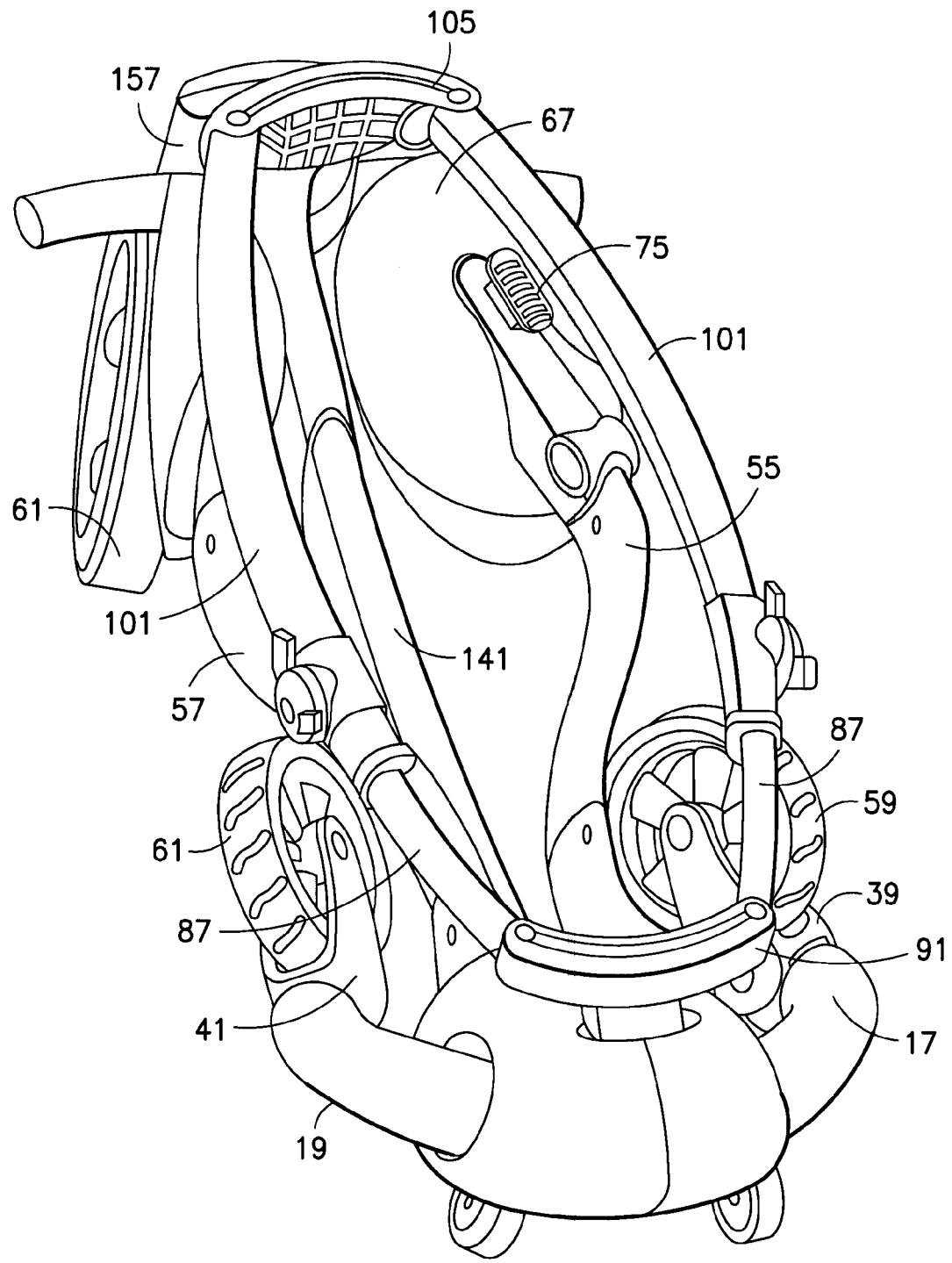
FIG. 9 is a front perspective view of the stroller of FIG. 1 shown in its fully closed position.

A proximal end 79, 81 of each rear leg 55, 57 is rotationally coupled to hub 3 for enabling rotational movement of the rear legs 55, 57 such that the rear legs 55, 57 are movable between an open position (see FIGS. 1-5) and a collapsed position (see FIG. 9).

Referring now to seating portion 11 of stroller 1, seating portion 11 includes a generally U-shaped lower seat frame assembly 83 and a generally U-shaped upper seat frame assembly 85. Lower seat frame assembly 83 and upper seat frame assembly 85 are coupled together giving seating portion 11 a generally elliptical-shaped appearance as shown in FIG. 1. Lower seat frame assembly 83 includes two lower arcuate seat frame components 87, each having the same radius, pivotally connected at a first end 89 to a seat frame mounting member 91 to allow each of the lower arcuate seat frame components 87 to pivot or rotate relative to seat frame mounting member 91.

Upper seat frame assembly 85 is comprised of two upper arcuate seat frame components 101, each having the same arc radius. The arc radius of each of the upper arcuate seat frame components 101 may be the same as the arc radius of lower arcuate seat frame components 87. This arc radius may be approximately 43 inches; however, this is not to be construed as limiting, as the upper and lower arcuate seat frame components may have other arc radii. Upper arcuate seat frame components 101 are pivotably connected at their first ends 103 to an upper seat frame mounting member 105 to allow each of the upper arcuate seat frame components 101 to pivot or rotate relative to the upper seat frame mounting member 105.

Figure 3:
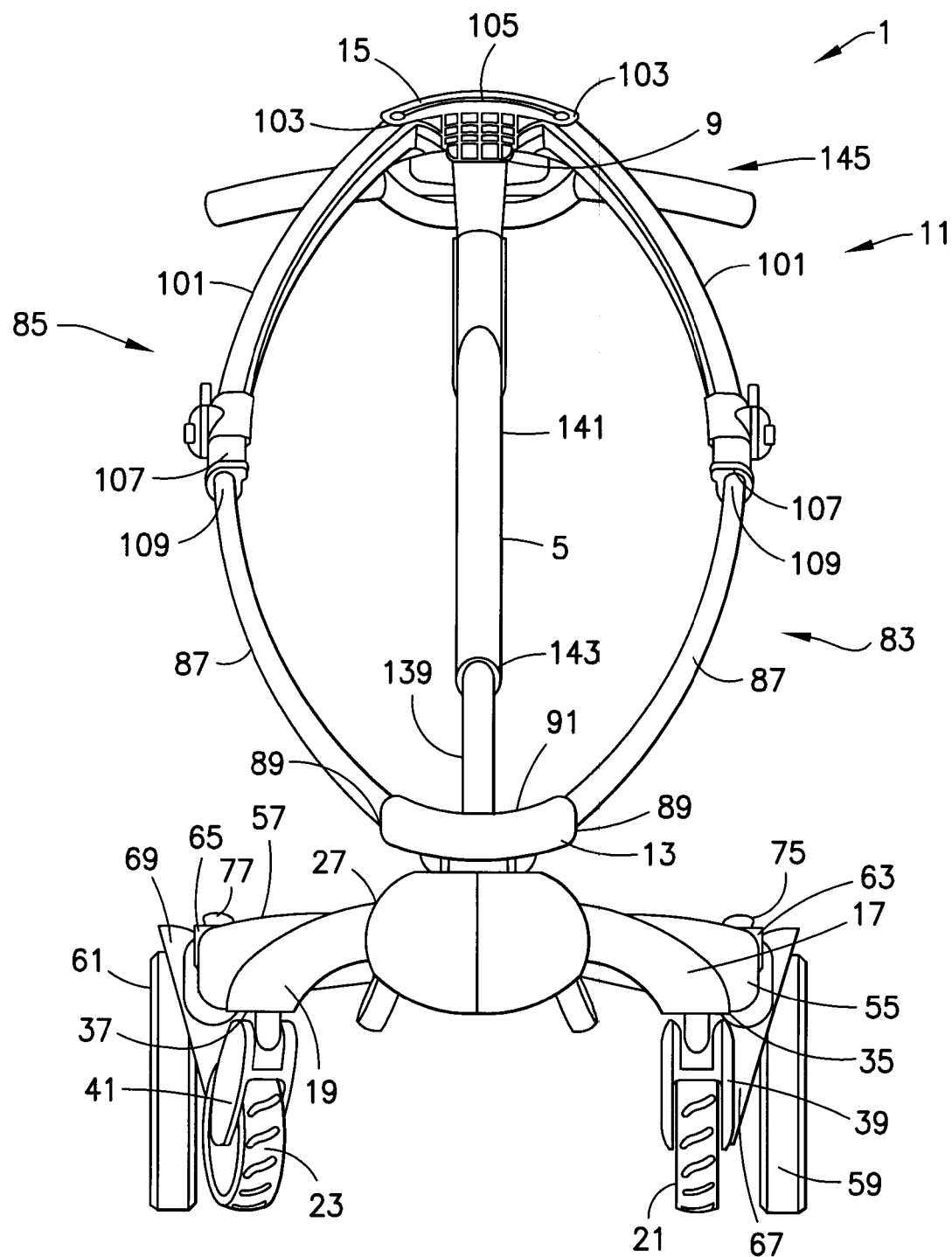
FIG. 3 is a front view of the stroller of FIG. 1 shown in its open position.
Figure 8:
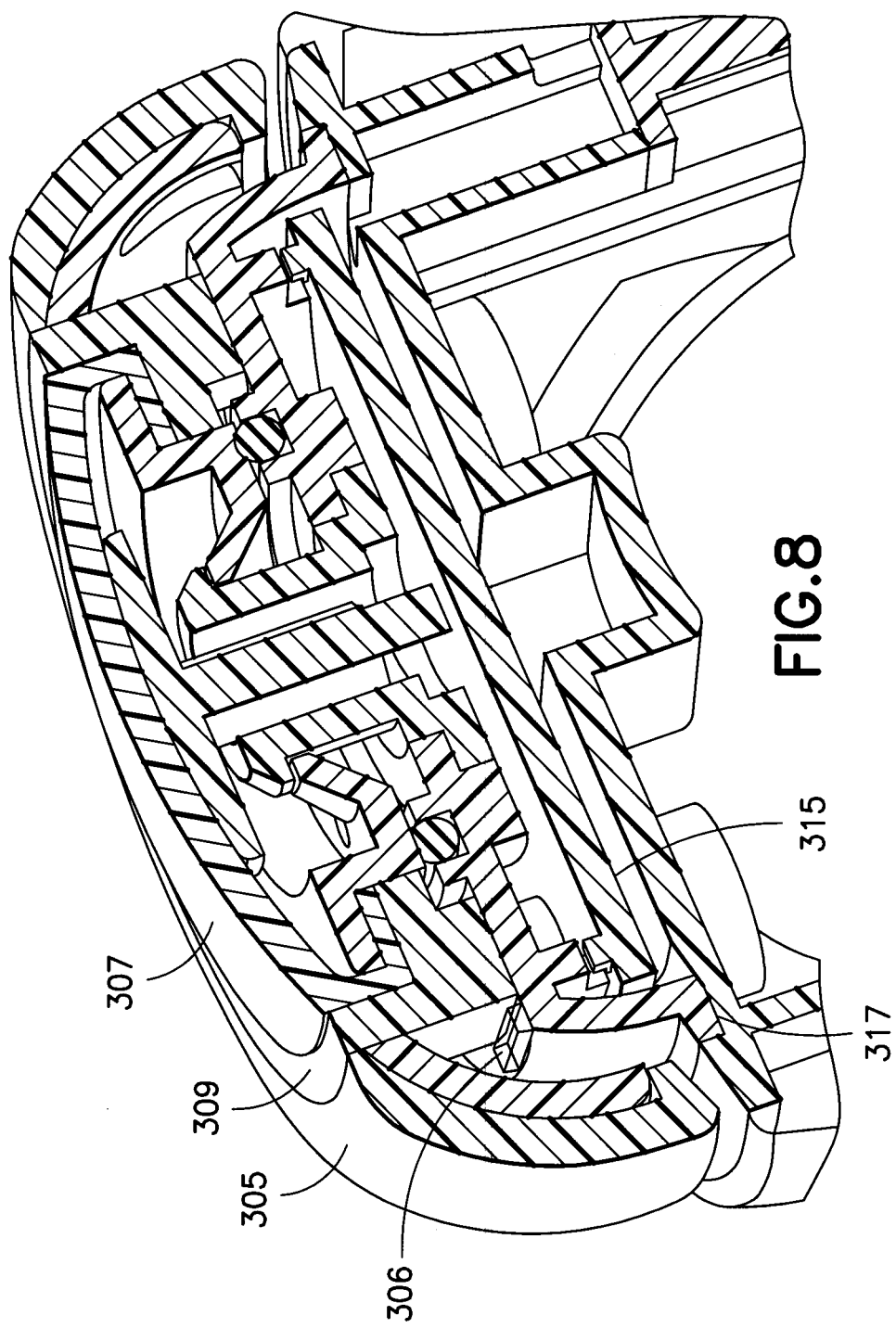
FIG. 8 is a cross-sectional perspective view of a user interface in accordance with the present invention.

Each upper arcuate seat frame component 101 is slidingly mated, at a second end 107, to a second end 109 of its corresponding lower arcuate seat frame component 87, such that upon collapsing stroller 1, each lower arcuate seat frame component 87 will be slidingly received into its corresponding upper arcuate seat frame component 101. In an alternative embodiment, each upper arcuate seat frame component 101 may be slidingly received within its corresponding lower arcuate seat frame component 87. As best seen by FIGS. 3 and 8, this arrangement of lower arcuate seat frame components 87 and upper arcuate seat frame components 101 allows the overall width of the generally U-shaped upper and lower arcuate seat frame assemblies 83, 85 to decrease (consistent with the decrease in the lateral width of the wheels) as they move from their open position as shown in FIG. 3 to their collapsed position shown in FIG. 9.

Seating portion 11 includes a seat (not shown) removably disposed upon seating portion 11. The seat (not shown) is desirably manufactured from a soft cloth-like material, such that the seat (not shown) collapses when stroller 1 is collapsed and expands when stroller 1 is opened.

Figure 4:
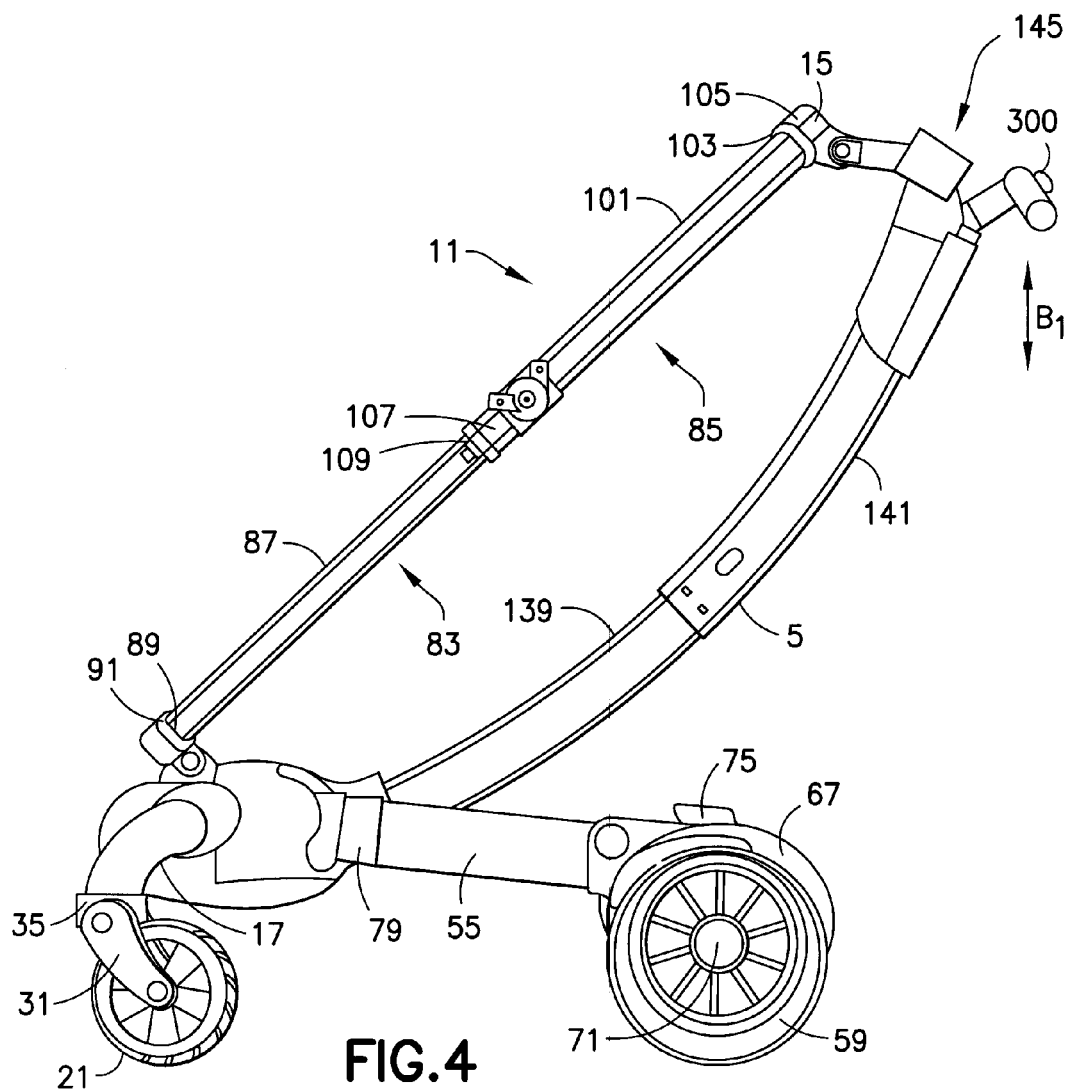
FIG. 4 is a right side view of the stroller of FIG. 1 shown in its open position.

With specific reference to FIGS. 3 and 4, support structure 5 desirably has an arcuate shape and includes a lower arcuate support component 139 and an upper arcuate support component 141. As with upper and lower arcuate seat frame components 87 and 101, upper arcuate support component 141 is slidingly mated with lower arcuate support component 139, such that upon collapsing stroller 1, lower arcuate support component 139 slidingly sleeves on two sets of raised skis (not shown) into upper arcuate support component 141. An upper arcuate support component end portion 143 may have raised skis on an interior surface thereof that make contact with lower arcuate support component 139. End portion 143 of upper arcuate support component 141 is configured to be slidingly sleeved over an end portion of lower arcuate support component 139, such that upon collapsing stroller 1, upper arcuate support component 141 will slidingly sleeve down over lower arcuate support component 139. As with the seat frame components 87 and 101, arcuate support components 139 and 141 are able to telescope or sleeve over or under each other because they have the same arc radius, but slightly different bore radii. A first end 7 of support structure 5 is fixably attached to the hub 3.

Figure 2:
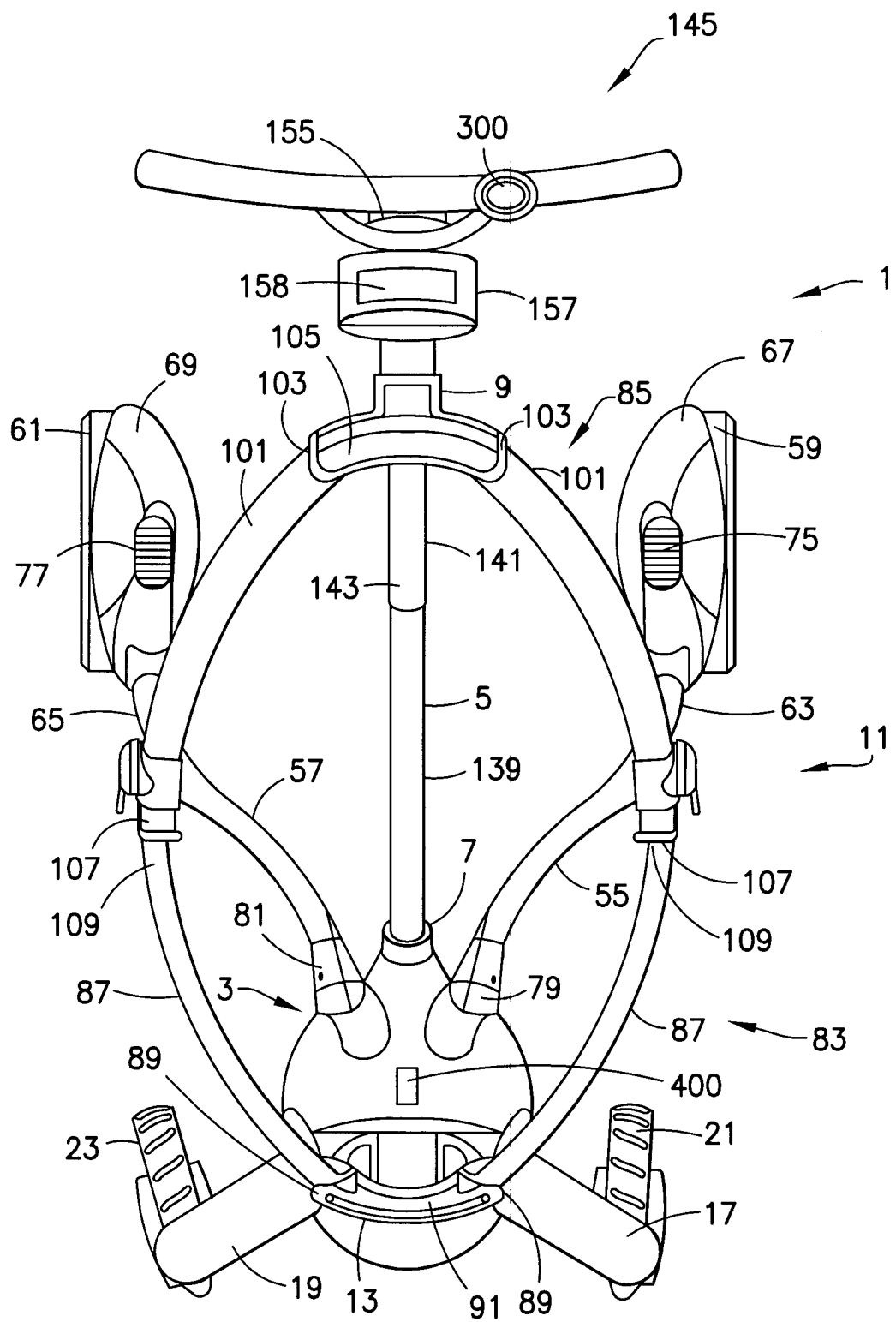
FIG. 2 is a top plan view of the stroller of FIG. 1 shown in its open position.
Figure 5:
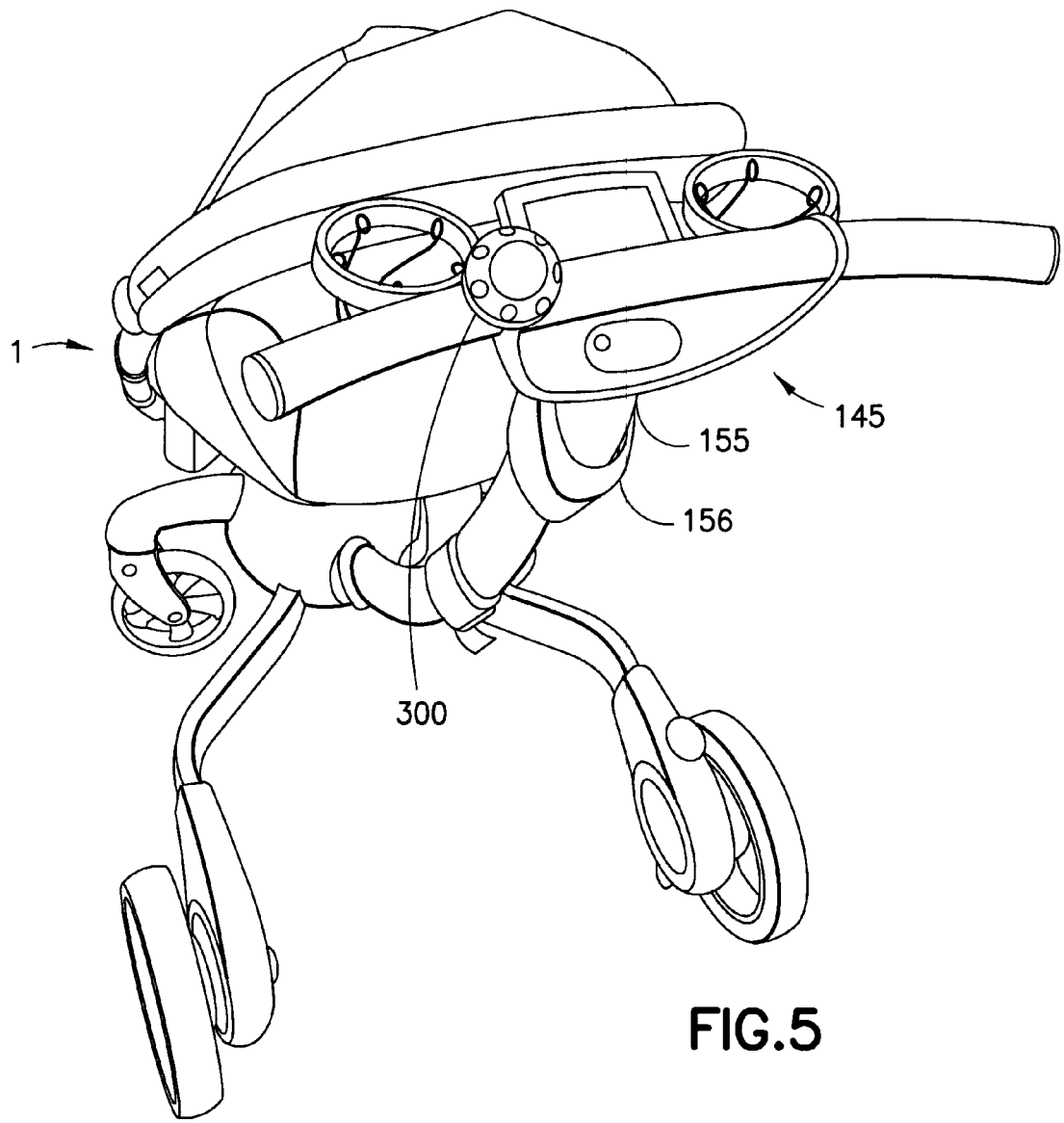
FIG. 5 is a rear perspective photographic view of a stroller in accordance with the present invention.
Figure 6:
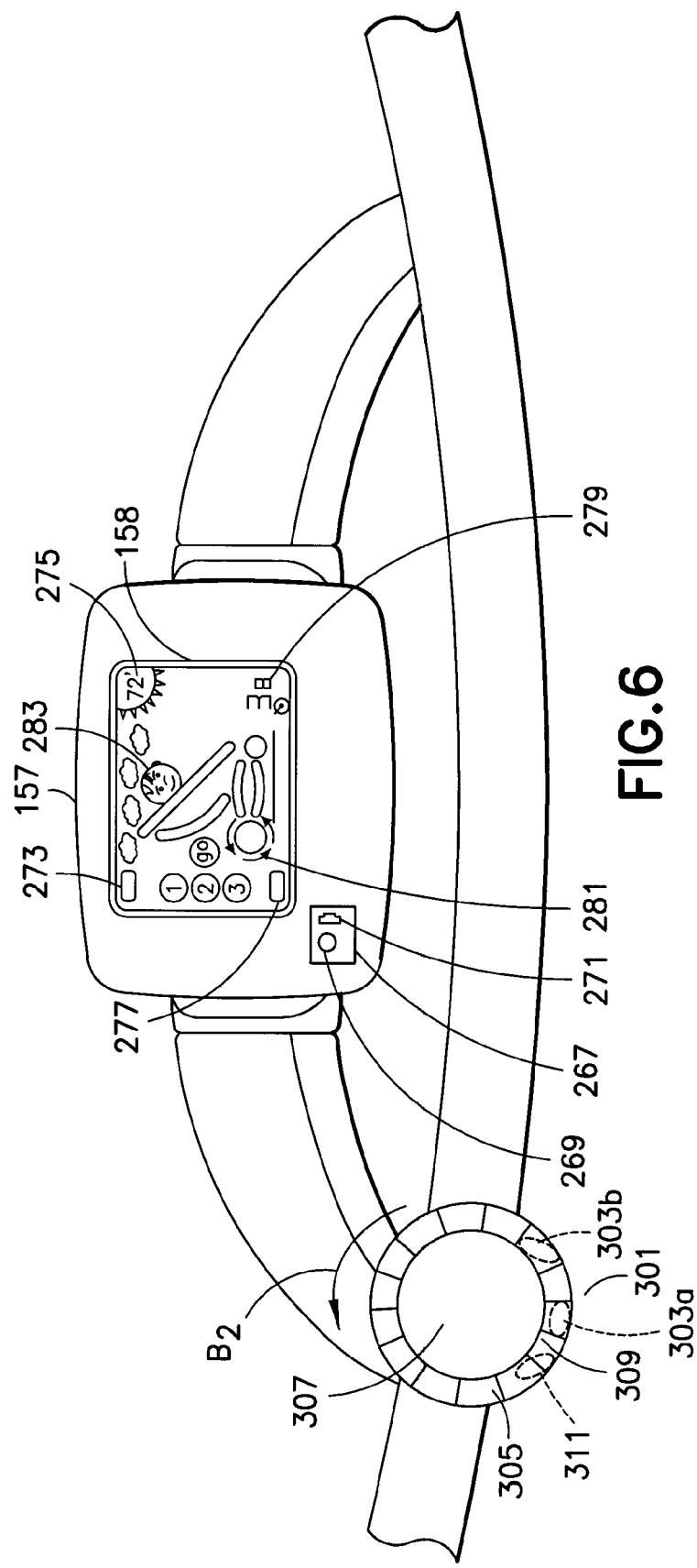
FIG. 6 is a top plan view of a handlebar assembly of the stroller of FIG. 1.
Figure 7:
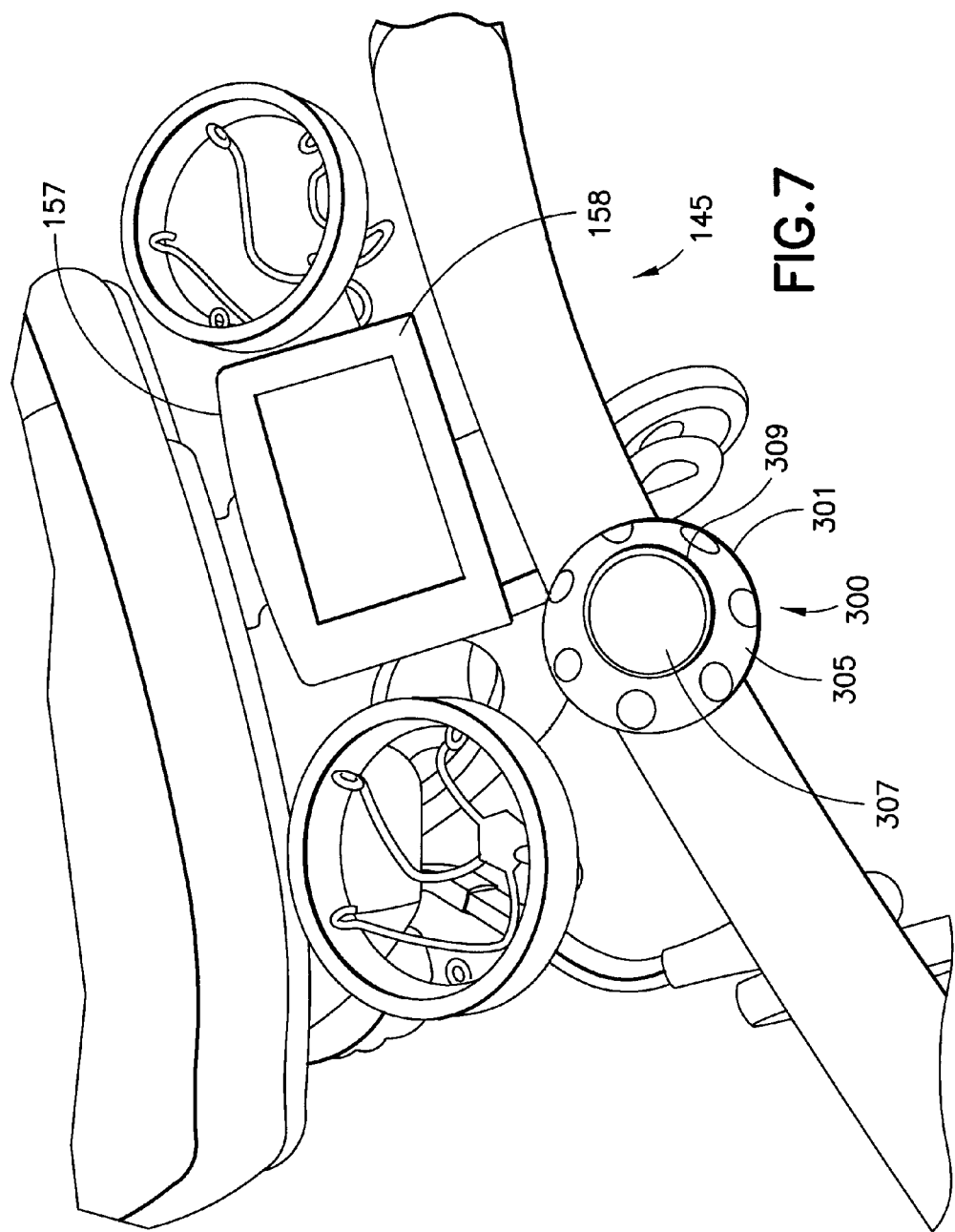
FIG. 7 is a rear perspective photographic view of the handle bar assembly.

With specific reference to FIGS. 2, 5, and 7, a user interface 300 for operating stroller 1 to move between a folded and unfolded position will be described. Second end 9 of support structure 5 is attached to a handlebar assembly 145. Handlebar assembly 145 allows a user to maneuver stroller 1. A central portion of handlebar assembly 145 is coupled to second end 9 of support structure 5 by a telescoping member 155. Telescoping member 155 extends vertically from second end 9 of support structure 5, thereby allowing a user to adjust handlebar assembly 145 for height in the directions of arrow $B_1$ shown in FIG. 4. Once the desired position for the height of handlebar assembly 145 is reached, a locking member 156 (see FIG. 5) is activated to lock the handlebar assembly 145 in place.

Handlebar assembly 145 may further include an information interface 157 having a display portion 158 to provide any of a wide variety of visual or audio feedback or ambient conditions to the user such as a battery level indicator 273, a temperature reading 275, an odometer 277, speedometer 279, clock (not shown), recharging indicator 281, the position of the stroller frame, whether the stroller will move toward its open or collapsed condition when next actuated, the presence of a baby or child in the stroller 283, instructions for use and operation of the stroller, emergency telephone numbers, environmental conditions, distance walked, average speed, or any other desired feature or parameter. Odometer 277 may be a permanent odometer providing a reading of the total distance traveled during the lifetime of stroller 1. The information interface may also include a general auxiliary device connector 267 through which various auxiliary devices may be interchangeably connected and controlled by the controller and/or suitable control switch of the stroller, which devices may be powered by the power source for the stroller, or through an independent power source. For instance, auxiliary device connector 267 may include a first port 269 for connecting speakers or a portable audio player, and a second port 271 for connecting a cell phone or other portable electronic device for recharging.

With reference to FIGS. 5-8, in order to be consistent with stroller safety standards, it is preferred to have at least two separate and distinct actions taken to initiate folding and unfolding of stroller 1. These at least two separate and distinct actions prevent unintentional folding on the part of the user. In addition, the interface for opening (unfolding) the stroller may be the same as the interface for closing (folding) the stroller; however two separate interfaces may be used. The actions required by the interface may be simultaneous or sequential and may include any combination of mechanical or electrical interactions including mechanical couplings to electrical interfaces, but must include at least one electrical interface. Simultaneous operation requires that each of the operations overlap at some point during operation, even if one of the operations is started before the other.

In one embodiment, a first activation means enables at least one other activation means for a predetermined period of time (such as 10 seconds) and at least one of the at least one other activation means sends a signal to a controller to activate a drive mechanism to fold or unfold. The first activation means may be either a mechanical interface (such as the rotating ring discussed hereinafter) or an electrical interface and the at least one other activation means may be an electrical interface (such as the button coupled to a circuit board discussed hereinafter). Any number of other steps may be performed by the user interface after the enabling step and prior to the activation of the drive mechanism.

More specifically, user interface 300 is desirably mounted on handlebar assembly 145 so that it is easily accessible by the user. However, this is not to be construed as limiting the present invention as user interface 300 may be positioned at any suitable location on stroller 1. User interface 300 includes a rotational mechanical joint 301 coupled to sensors 303a, 303b that must be activated by the user rotating a ring 305 in the direction of arrow $B_2$, combined with a second step of pressing a button 307 to activate the folding or unfolding process. The amount of rotation of ring 305 may be between about 45 and 120 degrees since this amount can be done easily with the thumb. However, this is not to be construed as limiting the present invention as the amount of rotation could be as little as 10 degrees on a sufficiently large ring, or could involve multiple rotations of the ring. Desirably, ring 305 is spring loaded to return to a home position. A stop 306 may be provided to indicate to the user when the ring has been rotated to the end position. Once ring 305 has been rotated, the required distance and returned to the home position, an indication, such as an LED light, may be provided to the user that the second action (e.g., pushing a button) can be undertaken. More specifically, it is important that the interface communicate to the user the state of the system, particularly in the event of a sequential interface. For instance, correctly activating ring 305 causes ring 305 to glow with an LED lighting ring 309 indicating that button 307 may now be pressed to fold or unfold the stroller. After a set amount of time, for example 30 seconds, the LED lighting ring 309 blinks if the button 307 has not been pressed, and then goes out indicating that user interface 300 has been reset.

The two sensors 303a, 303b are positioned within an enclosure 317 at approximately 15 degrees of activation and approximately 60 degrees of activation while a magnet(s) 311 is sealed within activating ring 305. Such a configuration allows for no electronic components to be provided in activating ring 305, and thus no wiring, slip rings, or other sensitive components, yet still have activating ring 305 cause electrical actuation of user interface 300. Enclosure 317, in which sensors 303a and 303b are provided, is completely sealed and has no joints where water, sand, or other elements could reach the electronics components of user interface 300. All of the circuitry provided in enclosure 317 on a circuit board 315 is therefore entirely enclosed. The only exception is button 307 in the center which reaches down to circuit board 315 and pushes a button (not shown) on it. Button 307 is provided with several layers of sealing to prevent water from reaching circuit board 315.

Sensors 303a, 303b may be embodied as sensors for detecting a magnetic field; however, this is not to be construed as limiting the present invention, as any suitable sensor may be utilized. As mentioned above, magnet(s) 311 is positioned in ring 305 to trigger each sensor 303a, 303b as ring 305 is rotated by the user. If the button is pressed while ring 305 is being rotated, ring 305 must be returned to the home position, then rotated to the correct position without any interference, and finally button 307 must be pushed to fold or unfold stroller 1. Similarly, if ring 305 is held in the end position and not returned to the home position before button 307 is pressed, user interface 300 does not grant access to fold or unfold stroller 1. Finally, if both sensors 303a, 303b are activated simultaneously (due to a strong external magnetic field), stroller 1 will not fold.

User interface 300 of the present invention also includes various timing aspects. For example, user interface 300 requires that the total amount of time from when the user begins to turn ring 305 until ring 305 is fully engaged and returned to the home position should not exceed a predefined limit, such as 10 seconds. These criteria can be adjusted as desired to ensure user interface 300 is robust to unintentional activation.

User interface 300 of the present invention may include the ability to be locked. For instance, a mechanical switch (not shown) may be engaged to prevent ring 305 from rotating. In an alternative embodiment, the switch may be electrical causing the system to ignore any inputs from ring 305 or button 307.

Alternatively, the interface could be completely electrical, such as entering a sequence of characters on a touch screen interface, such as display 158, requiring the user to touch virtual buttons on a touch screen interface, or even requiring the user to write the answer to a simple question on a touch screen interface in order to fold. In any of these interfaces, if the process is not completed correctly, stroller 1 would not function. A more sophisticated electronic interface with questions to answer has the additional benefit that a child cannot activate stroller 1 but an adult can easily activate stroller 1.

In addition, the interface may include timing, such as requiring the user to hold a first button for some time, for example, 3 seconds, and then press a second button. If the second button were depressed during the activation of the first button, or if the second button were not pressed within some short amount of time (for example 10 seconds) of holding the first button, or if the first button were held for too long (10 seconds instead of 3) the interface would reset. Such a user interface is discussed in co-pending U.S. patent application Ser. No. 12/554,479, which is hereby incorporated by reference in its entirety.

Many other potential embodiments of a user interface for activating a power folding stroller have been envisioned. For example, the interface may require the user to alternate between pushing a left and a right button 3 times each in quick succession. If either button were pressed too many or too few times, the system would not function.

The user interface 300 discussed hereinabove may be used to control other aspects of stroller 1 other than power folding. For example, stroller 1 may desirably include a lighting system that includes lights provided on the front legs 17, 19 thereof. The user interface 300 may be configured to control these lights. More specifically, a user of the stroller 1 may activate these lights by pressing the button 307 without rotating the ring 305. By pressing the button 307 in such a manner, the user may turn the lights from bright to dim to off.

The user interface 300 may also allow a user to customize their stroller. For instance, if the user rotates the ring 305 to the stop position and holds it there for a predetermined time period (e.g., 10 seconds), the display portion 158 of the information interface 157 will enter a setup mode and the LED lighting ring 309 turns off. The user can then cycle through the settings provided on the display portion 158 by, for example, rotating the ring 305 to make a change and pressing the button 307 to advance to the next setting. Examples of settings that can be changed are that the user can change the sex of the graphical indication that a child is present in the stroller 283 on the display portion and the user can change the units from Imperial to Metric.

A sleep mode is also provided in which the user can hold the button 307 for a predetermined time period, such as 10 seconds, without turning the ring 305 to place the stroller to sleep to save power.

Several other implementations of the user interface may also be utilized without departing from the scope of the present invention. For example, the user interface may be embodied as a "Deadman" switch in which the user is forced to engage a switch or rotating ring 305 throughout the entire folding process. This can be a safety feature to give the user more control of the folding process and may have an additional benefit of providing stability to the stroller frame as it changes positions. In addition, it may be desirable to force the user to put the stroller brake on, detected via an electrical switch, before engaging the activation mechanism of this user interface. This would be in addition to the two or more sequential or timing events already described since the brake may be used during normal operation.

Stroller 1 may also be provided with a manual override mechanism to allow manual movement of the stroller between its open and closed positions and/or manual movement of any stroller components between their first and second positions, which would normally be carried out automatically by a drive mechanism. Such manual override may be desirable for any of a number of reasons, such as the power source being too low to effect the desired automatic movement or the failure of any parts. The user interface should desirably communicate to the user when the stroller is in manual mode by displaying an icon on the display 158.

A wide variety of manual override mechanisms may be utilized in connection with the present invention. For instance, a clutch or clutches may be provided between one or more drive mechanism elements and their associated stroller components for use as a manual override, whereby the clutch may be moved to a position in which it effects disengagement of the drive mechanism. As another example, a mechanical lever or rotary element may be provided at any point in the drive mechanism and/or between the drive mechanism and one or more stroller components associated with the drive mechanism, which is movable between an automatic position (in which a drive mechanism is operatively engaged with one or more stroller components to move the one or more stroller components automatically) and a manual position (in which a drive mechanism is disengaged from its operative engagement with one or more stroller components). For example, a key hole 400 (see FIG. 2) may be provided to a top portion of hub 3 of stroller 1. If a manual override is desired, a user inserts a key (not shown) into the key hole 400 and turns it 90 degrees. This disengages the drive mechanism. In addition, a lever (not shown) is provided near first end 7 of support structure 5. If stroller 1 is in its open, unfolded position, this lever is lifted and causes the latching mechanisms discussed in co-pending U.S. patent application Ser. No. 12/554,479 to be disengaged. A user can then fold the stroller manually.

It will be appreciated that the above is merely by way of example, and that a wide variety of disengaging mechanisms may be utilized with a wide variety of different stroller designs, without departing from the inventive concepts of the present invention.

The stroller embodiments described in detail above, are simple, robust, and extremely easy to use. The various structures of stroller 1 may all be made of any suitable plastics, formed of metals, or constructed from any other suitable material.

Although a user interface for a power folding stroller has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements. For example, it is to be understood that this disclosure contemplates that, to the extent possible, one or more features of any embodiment can be combined with one or more features of any other embodiment.

The invention claimed is:

1. A user interface for a power folding stroller comprising:
   a first activation means for enabling at least one other activation means; and
   at least one of the at least one other activation means for sending a signal to the controller to activate a drive mechanism to fold the power folding stroller if the power folding stroller is in an unfolded state or unfold the power folding stroller if the power folding stroller is in a folded state,
   wherein the first activation means is a rotating ring configured to activate at least one first sensor and at least one of the at least one other activation means is a push button configured to activate at least one second sensor.

2. The user interface of claim 1, wherein the first activation means and at least one of the at least one other means are operated simultaneously.

3. The user interface of claim 1, wherein the first activation means and at least one of the at least one other activation means are operated sequentially.

4. The user interface of claim 1, wherein the user interface is mounted on a handlebar assembly of the power folding stroller.

5. The user interface of claim 1, wherein an indicator is provided once the first activation means has sent a signal to the controller.

6. The user interface of claim 1, wherein the first activation means enables the at least one other activation means for a predetermined period of time.

7. A method for activating a power folding stroller, comprising:
   activating a first activation means of a user interface to enable at least one other activation means; and
   activating at least one of the at least one other activation means to send a signal to a controller of the power folding stroller to fold the power folding stroller if the power folding stroller is in an unfolded state or unfold the power folding stroller if the power folding stroller is in a folded state,
   wherein the first activation means is a rotating ring configured to activate at least one first electrical sensor and the at least one other activation means is a push button configured to activate at least one second electrical sensor.

8. The method of claim 7, wherein the first activation means and the at least one other activation means are operated simultaneously.

9. The method of claim 7, wherein the first activation means and the at least one other activation means are operated sequentially.

10. The method of claim 7, wherein the first activation means enables the at least one other activation means for a predetermined period of time.

11. The method of claim 7, wherein an indicator is provided once the first activation means has sent a signal to the controller.

* * * * *